(12) United States Patent
Boesch et al.

(10) Patent No.: US 10,901,588 B2
(45) Date of Patent: Jan. 26, 2021

(54) METHOD AND APPARATUS FOR LOCATION AND CALIBRATION FOR CONTROLS ON A TOUCH SURFACE

(71) Applicant: GM GLOBAL TECHNOLOGY OPERATIONS LLC, Detroit, MI (US)

(72) Inventors: Michael J. Boesch, Roayal Oak, MI (US); James A. Carpenter, Rochester Hills, MI (US); Jayasimha V. Rao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/437,471

(22) Filed: Jun. 11, 2019

(65) Prior Publication Data

US 2020/0393955 A1    Dec. 17, 2020

(51) Int. Cl.
*G06F 3/0484* (2013.01)
*G06F 3/041* (2006.01)

(52) U.S. Cl.
CPC ........ *G06F 3/04845* (2013.01); *G06F 3/0416* (2013.01)

(58) Field of Classification Search
CPC .................... G06F 3/04845; G06F 3/0416
See application file for complete search history.

(56) References Cited

U.S. PATENT DOCUMENTS

| 9,720,446 | B2 * | 8/2017 | Bui | G06T 7/80 |
| 10,108,337 | B2 * | 10/2018 | Ligameri | G06F 3/0489 |
| 2013/0153388 | A1 * | 6/2013 | Chan | G06F 3/044 200/5 R |
| 2014/0168132 | A1 * | 6/2014 | Graig | G06F 3/0362 345/174 |
| 2018/0129336 | A1 * | 5/2018 | Files | G06F 3/042 |

\* cited by examiner

*Primary Examiner* — Stacy Khoo
(74) *Attorney, Agent, or Firm* — Lorenz & Kopf, LLP

(57) ABSTRACT

Methods and apparatus are provided for locating and calibrating a physical control for use with a graphical user interface. The apparatus includes a display operative to display a placement indicator and a user interface, a sensor operative to determine a placement location of a physical control, and a processor operative to generate the placement indicator, to receive the placement location and to determine an offset between the placement indicator and the placement location, the processor being further operative to generate the user interface in response to the offset and to couple the user interface to the display.

19 Claims, 5 Drawing Sheets

METHOD AND APPARATUS FOR LOCATION AND CALIBRATION FOR CONTROLS ON A TOUCH SURFACE

INTRODUCTION

The present disclosure relates generally to a system for configuring a touch sensitive user interface. More specifically, aspects of the present disclosure relate to systems, methods and devices for locating and calibrating the location of physical controls with graphical display elements by providing graphical indicators of location and orientation of features for the precise placement of mechanical features.

User interfaces in electronic devices provide essential feedback and control options to users. For example, in motor vehicles, analog gauges provided information on vehicle systems as well as physical controls, such as knobs and switches, to control vehicle systems in response to user input. Modern vehicles are increasingly implementing graphical, or electronic, display elements and touch screen inputs into the user interface. These graphical display elements allow drivers to select between various configurations or themes and allow drivers to select more or less information for display. As graphical display elements become more amorphous in shape, alignment of physical features to displayed elements is more challenging. It would be desirable to provide better alignment of physical features with graphical elements to overcome the aforementioned problems.

The above information disclosed in this background section is only for enhancement of understanding of the background of the invention and therefore it may contain information that does not form the prior art that is already known to a person of ordinary skill in the art.

SUMMARY

Disclosed herein are human machine interface methods and systems and related control logic for provisioning computational systems, methods for making and methods for operating such systems, and motor vehicles equipped with onboard control systems. By way of example, and not limitation, there is presented various embodiments of location and calibration for controls on a display in a motor vehicle, and a method for location and calibration for physical controls on a display are disclosed herein.

In accordance with an aspect of the present invention an apparatus having a display operative to display a placement indicator and a user interface, a sensor operative to determine a placement location of a physical control, and a processor operative to generate the placement indicator, to receive the placement location and to determine an offset between the placement indicator and the placement location, the processor being further operative to generate the user interface in response to the offset and to couple the user interface to the display.

In accordance with another aspect of the present invention wherein the sensor is further operative to determine a second location indicative of an operational limit of a physical control and wherein the processor is operative to generate a graphical element within the user interface in response to the second location.

In accordance with another aspect of the present invention wherein the physical control comprises a rotational knob and the operational limit comprises a maximum rotational setting.

In accordance with another aspect of the present invention wherein the graphical element comprises a volume indicator.

In accordance with another aspect of the present invention wherein the second location is indicated in response to an exercising of the physical control.

In accordance with another aspect of the present invention wherein the operational limit is indicative of a detent position within the physical control.

In accordance with another aspect of the present invention wherein the sensor comprises a touch sensor integral to the display.

In accordance with another aspect of the present invention wherein the placement indicator comprises an outline of the physical control.

In accordance with another aspect of the present invention a method operative to display a placement indicator on a touch sensitive display, to detect, via the touch sensitive display, a placement location in response to a physical control being placed on the touch sensitive display to determine, via a processor, a directional offset in response to the placement indicator and the placement location, to store the directional offset in a memory, for generating, via the processor, a user interface, and to display the user interface on a display wherein the location of the user interface on the display is shifted in response to the directional offset.

In accordance with another aspect of the present invention detecting via the touch sensitive display a location indicative of an operational limit of the physical control and generating a graphical element within the user interface in response to the second location and the directional offset.

In accordance with another aspect of the present invention wherein the physical control comprises a rotational knob and the operational limit is a maximum rotational setting.

In accordance with another aspect of the present invention wherein the graphical element comprises a volume indicator.

In accordance with another aspect of the present invention wherein the location indicative of the operational limit of the physical control is indicated in response to an exercising of the physical control.

In accordance with another aspect of the present invention wherein the operational limit is indicative of a detent position within the physical control.

In accordance with another aspect of the present invention wherein the placement indicator comprises an outline of the physical control.

In accordance with another aspect of the present invention a display calibration device having a touch sensitive display for displaying a placement indicator and for detecting a placement location in response to a physical control being affixed to the display, and a processor for determining a directional offset in response to the placement indicator and the placement location and for generating a user interface for display on the touch sensitive display, wherein the processor is further operative to shift the location of the user interface on the touch sensitive display in response to the directional offset.

In accordance with another aspect of the present invention wherein the touch sensitive display is further operative to detect a second location indicative of an operational limit of the physical control and wherein the processor is operative to generate a graphical element within the user interface in response to the second location.

In accordance with another aspect of the present invention wherein the physical control comprises a rotational knob and the operational limit is a maximum rotational setting indicative of a detent position within the rotational knob.

In accordance with another aspect of the present invention wherein the graphical element comprises a volume indicator.

In accordance with another aspect of the present invention wherein the second location is indicated in response to an exercising of the physical control.

The above advantage and other advantages and features of the present disclosure will be apparent from the following detailed description of the preferred embodiments when taken in connection with the accompanying drawings.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
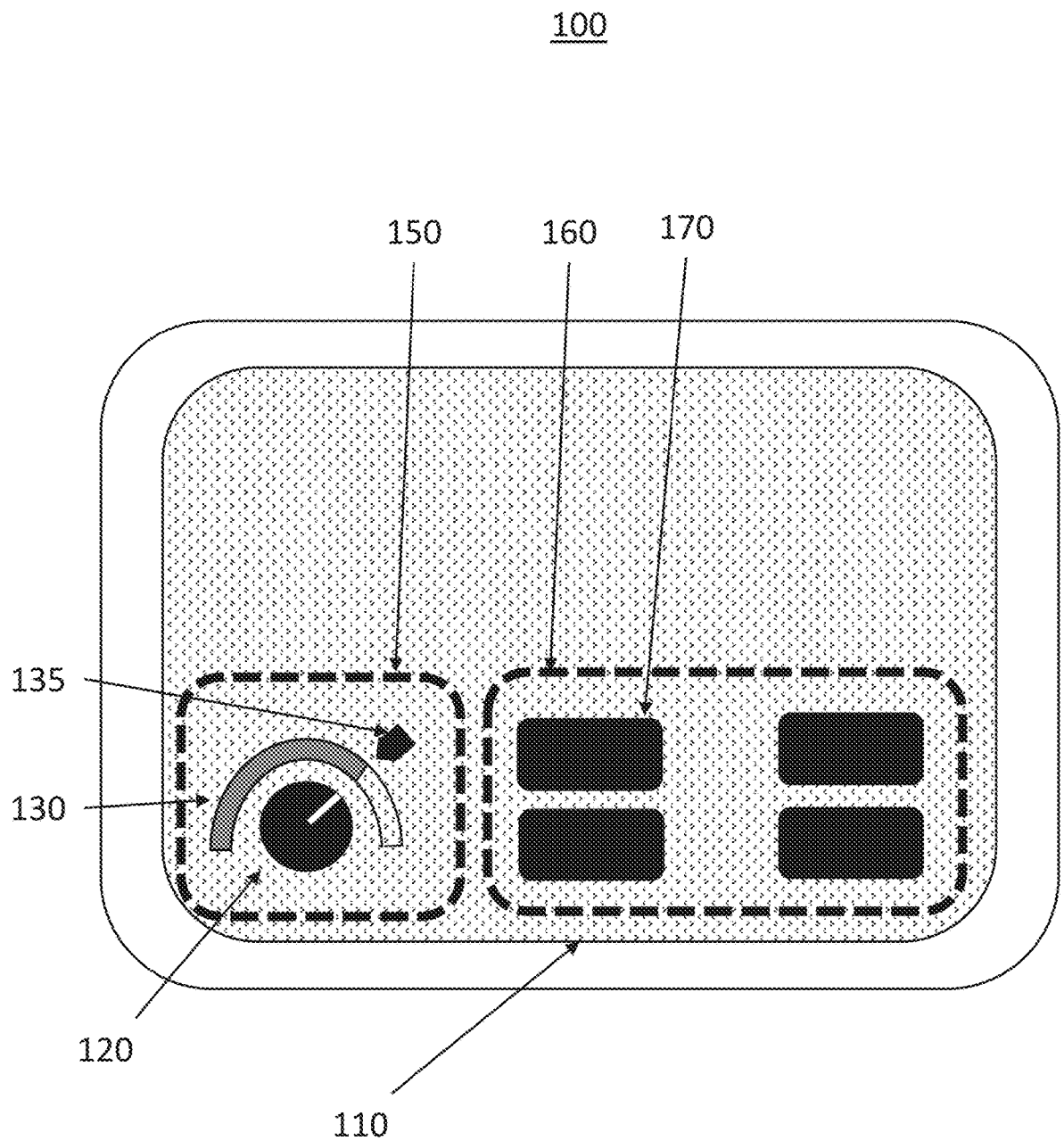
FIG. 1 shows an application for the method and apparatus for location and calibration for controls on a user interface according to an exemplary embodiment of the present disclosure.

Turning now to FIG. 1, an environment for a system 100 for location and calibration for controls on a user interface according to an exemplary embodiment of the present disclosure is shown. The exemplary environment 100 may include a graphical display 110, liquid crystal display (LCD), light emitting diode (LED) based graphical display or an organic light emitting diode (OLED) based graphical display, a physical control 120, such as a knob, and a graphical element 130 displayed by the graphical display 110.

In this exemplary embodiment, the graphical display 110 is part of a vehicular infotainment system used to display vehicle user interface (UI) information, entertainment, navigational instructions and the like. The physical control 120 in this exemplary embodiment is a rotational knob with a line indicator applied to the knob. The physical control 120 may be rotated clockwise or counterclockwise to adjust a setting of the infotainment system, such as sound volume. The physical control 120 may include one or more detents for mechanically stopping the rotation of the physical control 120 at a point of rotation. For example, a detent may be located at a starting point indicative of zero volume and a second detent may be located at a second location indicative of full volume. In addition, detents may be located at various incremental locations during the extent of rotation.

The exemplary system 100 further comprises a first graphical element 130 and a second graphical element 135 displayed by the graphical display 110. The first graphical element 130 and the second graphical element 135 are provided as feedback to the user in response to the rotation of the physical control 120. In this exemplary embodiment, at the physical control 120 is rotated clockwise to increase a volume portions of the first graphical element 130 change color indicating the rotational location of the physical control 120. The second graphical element 135, here shown as an arrow, may also be presented in a rotational manner to indicate a current setting of the physical control 120. In this exemplary embodiment, when the physical control 120 is rotated clockwise until a detent is reached, the first graphical element 130 will be fully color changed to the darker color and the second graphical element 135 will be pointed at the end, or the "three o'clock" position, of the first graphical element 130 and the line indicator of the knob. In additional exemplary embodiments, the physical control 120 line may be a surface feature or a color feature or multiple features of the user interface.

It is important for customer quality perception that the graphical elements are displayed with at accurate location corresponding precisely to the physical control 120. For example, if the first graphical element 130 were to change color at a rotational speed different than the rotational speed of the physical control 120, this would be negatively perceived by the user. Also, if the first graphical element 120 is located in a position not centered on the center of the physical control 120, this would also be negatively perceived by the user. It is critical to implement a process that provides a method for accurate location and calibration of physical controls on the surface of a display during manufacture. The presently disclosed system and method address this problem by using graphical elements on the graphical display 110 to provide location and orientation features for the precise placement of physical control 120. Using a touch panel sensor within the graphical display 110 may also be used to provide a calibration control and shift the coordinating graphical elements 130, 135 to align precisely with the physical control 120. For example, exercising the physical control 120 during manufacturing to collect data points representative of the available tolerance/noise, enables the ability to calculate and store more precisely the mean values of each detent location in a calibration table.

In addition, the exemplary system 100 may comprise a graphical display 110 having a first zone 150 and a second zone 160. The first zone 150 and the second zone 160 may be configurable in response to the calibration table to be touch sensitive or non-touch sensitive in order to enable different functional elements. For example, in a first application, the physical control is applied to a location at the lower left portion of the graphical display 110. It may be desirable to have a non-touch sensitive area, such as the first zone 150, around the physical control 120 during normal operation such that when the physical control 120 is being manipulated by a user such that no additional touch sensor indications are inadvertently registered other than the articulation of the physical control 120. In addition, some touch sensitive controls, or virtual buttons 170, may be enabled in a different portion of the graphical display 110. It would be desirable to enable the touch sensitive interface in the second zone 160 such that the virtual buttons 170 may be actuated. In a different application of the graphical display, such as a different model or brand of vehicle, the physical control 120 may be located in a different location and therefore the first zone 150 and the second zone 160 may be relocated in response to the calibration table in order to facilitate the different user interface.

In an exemplary embodiment of a user interface displayed on the graphical display 110, different zones may enable different functional elements, such as Touch vs non-touch zones. Physical controls 120 may include knobs on the graphical display, switches, jog functions etc. Different applications of the graphical display 110, such as varying vehicle programs may require a variety of human machine interfaces to be supported depending on particular brand or model. Dynamic loading of on board diagnostic, or safety calibration would enable reuse of single type of integrated center stack hardware across several vehicle configuration. For some safety related controls, such as a front defogger control, on board diagnostic and safety zone demand stringent runtime failure diagnostics. Dynamic loading of calibration table into graphical display 110 may enable variable on board diagnostic and safety diagnostic scan of specific zones such that the human machine interface can dynamically map different on board diagnostic and safety zones depending upon use case. Dynamic calibration may be operative to support human finger touch and/or stylus touch for dynamic calibration. In addition, some designated zones may support variable touch performance, such as different report rate, touch scan rate, failure modes, etc. The system enables variable diagnostics in order to support Touch vs Physical elements on a single Touch layer and runtime Dynamic Calibration by the processor 215 thereby enhancing human machine interface opportunities and flexibility.

Figure 2:
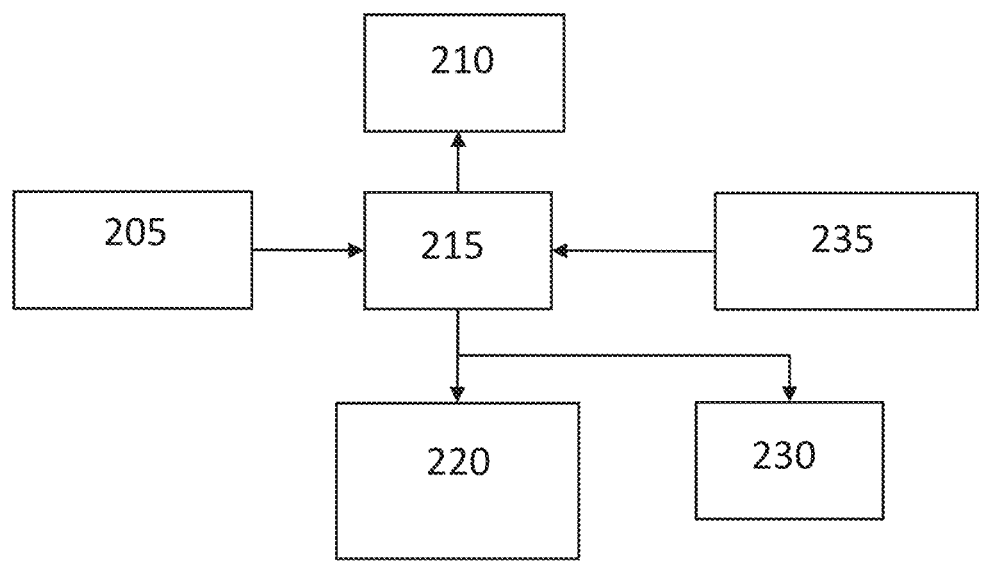
FIG. 2 shows a block diagram illustrating a system for location and calibration for controls on a user interface according to an exemplary embodiment of the present disclosure.

Turning now to FIG. 2, a block diagram of an exemplary system for location and calibration for controls on a display 200 according to an exemplary embodiment of the present disclosure is shown. The system 200 includes a display 210, a touch sensor 205, a processor 215, a physical control 235 and a controller 220.

During an installation mode, the processor 215 is operative to generate a control signal indicative of one or more graphical elements to be displayed by the display 210 and the location for the graphical elements to be displayed within the display 210. The display is operative to display the graphical elements in response to the control signal from the processor 215. The touch sensor 205 is then operative to receive an indication of a physical control being placed on the display 210. The indication may be the result of a capacitive change in an electric field generated by the touch sensor 205. Alternatively, the indication may be the result of a resistive change indicative of pressure at a point on the touch sensor 205.

The touch sensor 205 is then operative to generate a control signal indicative of a location of the physical control on the display 210. The touch sensor 205 is then operative to couple the control signal to the processor 215. The processor 215 is operative to receive the control signal from the touch sensor 205 and to determine an offset between the locations for the graphical elements to be displayed on the display 210 and the location of the physical control 235 indicated by the control signal. The processor 215 is then operative to calculate a calibration factor in response to the offset and store the calibration factor in a memory 230.

According to another aspect of the exemplary embodiment, the processor 215 is further operative to generate a user interface as a function of the infotainment function. The user interface is coupled to the display 210 for display along with the calibration factor. The display 210 is then operative to receive the user interface and the calibration factor from the processor 215 and to display the user interface in accordance with the calibration factor. When the user interface is displayed by the display in accordance with the calibration factor, the user interface placement within the display is adjusted in accordance with the offset such that the user interface is aligned with the physical control 235. Alternatively, the processor 215 may be operative to adjust the user interface in accordance with the calibration factor to generate an adjusted user interface. The adjusted user interface is then coupled to the display for presentation to the user.

The processor 215 is further operative to receive a control signal from the physical control 235 in response to a user manipulation of the physical control 235. The processor 215 is then operative to generate a control signal for coupling to the controller 220 for adjustment of an infotainment system characteristic, such as sound volume. The processor is further operative to adjust the user interface in response to the control signal from the physical controller 235 and couple the adjusted user interface to the display 210. The adjusted user interface may be indicative of the change in the infotainment system characteristic, such as altering the indication of the sound volume level of the infotainment system.

Figure 3:
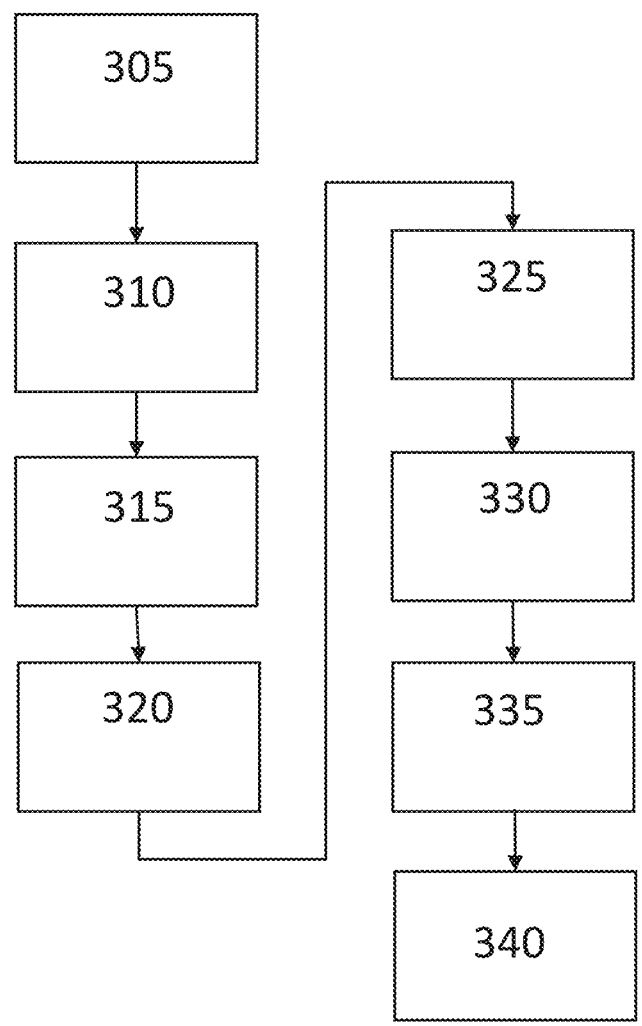
FIG. 3 shows a flow chart illustrating a method for location and calibration for controls on a user interface according to an exemplary embodiment of the present disclosure.

Turning now to FIG. 3, a flow chart illustrating an exemplary method for location and calibration for controls on a display 300 according to an exemplary embodiment of the present disclosure is shown. In this exemplary embodiment the method is first operative to generate an indication of a placement location 305 of a physical control on a display. The placement location may be indicated by an outline of the physical control displayed on the display, a series of alignment markers or lines displayed on the display, or the display of a graphic element associated with the physical control, such as a sound volume indicator. Alternatively, the placement location may be indicated by a single mark, such as a point display. The placement location may be indicated by a physical feature, such as a notch in a touch sensor or a printed indicator applied directly to a touch sensor.

The method is then operative to receive 310 an indication of a placement and a placement location detection of the physical control. The indication may be received via a touch sensor integral to the display. The method is then operative to determine 315 an offset between the placement location generated by the processor and the placement location detection received from the touch sensor. The method is then operative to store the offset 320 in a memory. The method is then operative to receive 325 a control signal indicative of an operation of the physical control wherein the control signal is indicative of the physical control being set to a maximum level. The method is then operative to determine 330 a graphical location representative of a maximum indication of a graphical element. The method is further operative to store 335 the graphical location in a memory. The method is then operative to generate 340 a user interface for coupling to the display, wherein the user interface includes the graphical element having a maximum indication located at the graphical location and for coupling the offset to the display such that the graphical interface is displayed in response to the offset such that the user interface is aligned with the physical control.

Figure 4:
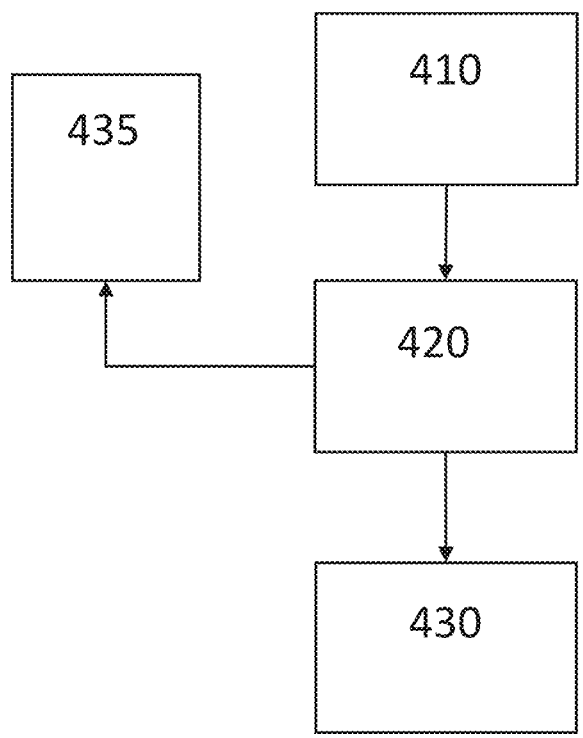
FIG. 4 shows a block diagram illustrating a system for location and calibration for controls on a user interface according to another exemplary embodiment of the present disclosure.

Turning now to FIG. 4, a block diagram of a system for location and calibration for controls on a display 400 according to an exemplary embodiment of the present disclosure is shown. The system includes a touch sensitive user interface 410 for detecting user input and for displaying a graphical user interface. The touch sensitive user interface 410 may be a touch sensitive display and may be operative to receive a graphical user interface from the processor 420 and to display the graphical user interface via a graphical display, such as an LCD, LED or OLED display. The touch sensitive user interface 410 is further operative to receive input via the touch sensors integral to the touch sensitive user interface y 410. A user touch may be detected through capacitive detector or resistive detection. The touch sensitive user interface 410 is operative to determine a location of the user touch relative to the displayed user interface. Thus, if a user touches a location where a virtual button is displayed, the processor 420 may be operative to activate a function in response to the virtual button. The touch sensitive user interface 410 is operative to couple the location of the detected user touch to the processor. The touch sensitive user interface 410 may be further operation to couple other characteristics of the user touch to the processor, such as movement, duration of touch, etc.

According to an exemplary embodiment, the touch sensitive user interface 410 is operative to display a placement indicator and a user interface. The placement indicator is generated in response to a signal by the processor 420 and is indicative of a location for a physical control 435 to be affixed to the surface of the touch sensitive user interface 410. The physical control 435 may be a rotational knob, a button, a slider, or the like. The physical control 435 may generate an electronic signal coupling back to the processor 420 indicative of the position or state of the physical control 435. Alternatively, the physical control 435 may be operative to alter a signal generated by processor 420, such as altering a resistance of the physical control 435 as the position is altered, such as a knob being rotated. The display 410 is further operative to detect when a physical control is affixed to the surface of the display via the touch sensors within the display. The display is operative to determine a location of the physical control 435 in response to the detection and to couple this placement location to the processor 420.

The processor 420 is operative to generate the placement indicator for display on the touch sensitive user interface 410 and to receive the placement location and to determine a directional offset between the placement indicator and the placement location. The directional offset may be indicative of an estimated location of the graphical user interface, and the actual location as defined in response to the placement of the physical control 435. The processor 420 is then operative to save this directional offset in a memory for use as a calibration factor when generating a user interface for display on the display 410. The processor is then operative to generate a user interface in response to the offset and to couple the user interface to the display. For example, if the processor determines that the directional offset is 2 mm to the left, the user interface may be shifted by 2 mm to the left in order to properly align the user interface with the affixed physical control 435.

In an additional exemplary embodiment, the sensor is further operative to determine a second location indicative of an operational limit of a physical control 435 wherein the processor 420 is operative to generate a graphical element within the user interface in response to the second location. During installation of the physical control 435, the physical control may be exercised and detected by the touch sensors within the touch sensitive user interface 410 or a signal may be generated by the physical control 435 during exercising and coupled to the processor 420, or both. In an exemplary embodiment, in order to minimize systemic deviation of detent calibration values, the physical control 435 may be exercised to collect data points proximate to the detent and the average weighted value retained. The processor 420 is then operative to determine the operational limit, such as the location of a detent in a knob and to correlate the location and indication of the graphical element in response to the operational limit. For example, the physical control 435 is a rotational knob and the operational limit is a maximum rotational setting. The processor is operative to generate a sound volume indicator in response to the rotational setting with a maximum being displayed in concert with the maximum rotational setting be reached.

The processor 420 is further operative to receive a signal from the touch sensitive user interface 410 or the physical control 435 and to alter an infotainment characteristic in response to the signal. For example, processor 420 may receive an indication from the physical control 435 to turn the infotainment system to an on mode. The processor 420 is then operative to generate a control signal to couple to the controller 430 to initiate the powering on of the infotainment system components.

In another exemplary embodiment, the physical control 435 may be a rotational know, a slider, or the like with multiple detents within the operational range of the physical control 435 in order to divide the operational range of the physical control 435 into discrete increments. For example, a rotational knob having a detent at a center position, or a physical slider having multiple detents at 10% intervals. In this exemplary embodiment, the physical control 435 is exercised by a user or a robotic interface during installation. The touch sensor 410 monitors the position of the physical control 435 by, for example, detecting the position of a capacitive element, such as a metal tab within the physical control 435. When the physical control 435 reaches a detent, the user may activate an indicator to indicate that the detent has been reached, such as pushing a button on a user interface or depressing the physical control 435 if it has a push button feature. The touch sensor 410 would then register this position as a detent in response to the user indication. This process would be repeated for each detent in the operational range of the physical control 435. In addition, this process could be repeated through multiple spans of the operational range of the physical control 435 and the detent location determined in response to multiple user activations. Once the detent positions are estimated, the data indicative of the positions are stored in the memory and are used for calibrating a user interface.

Alternatively, the touch sensor 410 could monitor the location of the capacitive element and infer the location of a detent in response to the rate of movement of the physical control 435. For example, if the physical control 435 is a rotational knob, the rate of rotation may be slightly increased as the knob reaches a detent, and the rotation may be stopped for a short time until the force of rotation is great enough to overcome the detent resistance is overcome. The touch sensor 410 and/or the processor 420 are operative to monitor the rate of movement, detect the slight change in rate of movement, and then store the physical control 435 setting at the location of the slight change in rate of motion as a detent.

This process could be continued for the operational range of the physical control 435 and could be repeated over the operational range of the physical control 435 and the detent position determined in response to multiple indications of slight change in rate of motion. Once the detent positions are estimated, the data indicative of the positions are stored in a memory and are used for calibrating a user interface.

Figure 5:
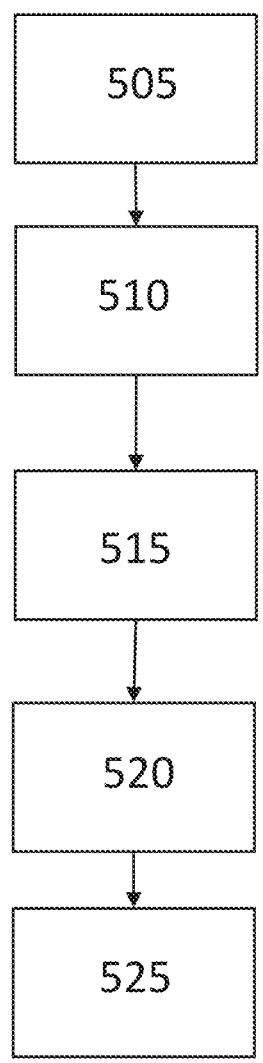
FIG. 5 shows a flow chart illustrating a method for location and calibration for controls on a user interface according to another exemplary embodiment of the present disclosure.

Turning now to FIG. 5, a flow chart illustrating another exemplary method for location and calibration for controls on a display 500 according to an exemplary embodiment of the present disclosure is shown.

A method is first operative to display 505 a placement indicator on a touch sensitive display. The method then detects 510, via the touch sensitive display, a placement location in response to a physical control being placed on the touch sensitive display. For example, the placement indicator may comprise an outline of the physical control. Alternatively, the placement indicator may be alignment markers displayed on the display. The method is then operative to determine 515 via a processor or the like, a directional offset in response to the placement indicator and the placement location. The method may then be operative to store the directional offset in a memory. The method then generates 520, via the processor, a user interface and couples this user interface to a display device. The method is then operative to display 525 the user interface on the display device wherein the location of the user interface on the display is shifted in response to the directional offset.

In an alternative embodiment, the method may be operative to detect via a touch sensitive display a location indicative of an operational limit of the physical control and generating a graphical element within the user interface in response to the second location and the directional offset. In this exemplary embodiment, the physical control may comprise a rotational knob for adjusting a sound volume and the operational limit is a maximum rotational setting and the graphical element comprises a volume indicator. The location indicative of the operational limit of the physical control may be indicated in response to an exercising of the physical control during system calibration or during an initial installation. The operational limit may be indicative of a detent position within the physical control.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus for calibrating a user interface displayed by a display system of a vehicle comprising:
    a display screen operative to display a placement indicator;
    a touch sensor associated with the display screen and operative to determine a placement location of a physical control placed on the display screen; and
    a processor operative to generate the placement indicator, to receive the placement location and to determine an offset between the placement indicator and the placement location, the processor being further operative to generate calibration data used to calibrate the user interface in response to the offset and to store the calibration data in a memory for use in aligning the user interface with the physical control on the display screen in the vehicle.

2. The apparatus of claim 1 wherein the touch sensor is further operative to determine a second location indicative of an operational limit of the physical control and wherein the processor is operative to generate a graphical element within the user interface in response to the second location.

3. The apparatus of claim 2 wherein the physical control is a rotational knob and the operational limit is a maximum rotational setting.

4. The apparatus of claim 2 wherein the graphical element is a volume indicator.

5. The apparatus of claim 2 wherein the second location is indicated in response to an exercising of the physical control.

6. The apparatus of claim 2 wherein the operational limit is indicative of a detent position within the physical control.

7. The apparatus of claim 1 wherein the placement indicator is a printed registration mark on the touch sensor.

8. A method comprising:
    displaying a placement indicator on a touch sensitive display;
    detecting, via the touch sensitive display, a placement location in response to a physical control being placed on the touch sensitive display;
    determining, via a processor, a directional offset in response to the placement indicator and the placement location;
    storing the directional offset in a memory;
    generating, via the processor, a user interface; and
    displaying the user interface on the touch sensitive display in a vehicle wherein the location of the user interface on the display is aligned with the physical control based on the directional offset.

9. The method of claim 8 further comprising detecting via the touch sensitive display a location indicative of an operational limit of the physical control and generating a graphical element within the user interface in response to the second location and the directional offset.

10. The method of claim 9 wherein the physical control comprises a rotational knob and the operational limit is a maximum rotational setting.

11. The method of claim 9 wherein the graphical element comprises a volume indicator.

12. The method of claim 9 wherein the location indicative of the operational limit of the physical control is indicated in response to an exercising of the physical control.

13. The method of claim 9 wherein the operational limit is indicative of a detent position within the physical control.

14. The method of claim 8 further comprising generating a non touch sensitive zone within the user interface located in response to the directional offset and the physical control.

15. A display calibration device for calibrating a display of a vehicle comprising:
    a touch sensitive display operative to display a placement indicator and further operative to detect a placement location in response to a physical control being affixed to the touch sensitive display; and
    a processor operative to determine a directional offset in response to the placement indicator and the placement location and to generate a user interface for display on the touch sensitive display, wherein the processor is further operative to align the location of the user interface on the touch sensitive display with the physical control based on the directional offset.

16. The display calibration device of claim 15 wherein touch sensitive display is further operative to detect a second location indicative of an operational limit of the physical control and wherein the processor is operative to generate a graphical element within the user interface in response to the second location.

17. The display calibration device of claim 16 wherein the physical control is a rotational knob and the operational limit is a maximum rotational setting indicative of a detent position within the rotational knob.

18. The display calibration device of claim 16 wherein the graphical element is a volume indicator.

19. The display calibration device of claim 16 wherein the second location is indicated in response to an exercising of the physical control.

\* \* \* \* \*